(12) United States Patent
Zhu et al.

(10) Patent No.: US 9,272,664 B2
(45) Date of Patent: Mar. 1, 2016

(54) NAKED EYE 3D VIDEO SYSTEM FOR BACKING A VEHICLE AND VEHICLE INCLUDING THE SYSTEM

(71) Applicant: NVIDIA Corporation, Santa Clara, CA (US)

(72) Inventors: Hao Zhu, Shenzhen (CN); Shuanghu Yan, Shenzhen (CN); Yu Zhang, Shenzhen (CN)

(73) Assignee: NVIDIA Corporation, Santa Clara, CA (US)

( * ) Notice: Subject to any disclaimer, the term of this patent is extended or adjusted under 35 U.S.C. 154(b) by 620 days.

(21) Appl. No.: 13/668,027

(22) Filed: Nov. 2, 2012

(65) Prior Publication Data

US 2014/0049602 A1 Feb. 20, 2014

(30) Foreign Application Priority Data

Aug. 14, 2012 (CN) .......................... 2012 1 0288524

(51) Int. Cl.
| | |
|---|---|
| *H04N 7/18* | (2006.01) |
| *H04N 7/00* | (2011.01) |
| *H04N 13/02* | (2006.01) |
| *B60R 1/00* | (2006.01) |
| *H04N 13/04* | (2006.01) |

(52) U.S. Cl.
CPC .............. *B60R 1/00* (2013.01); *H04N 13/0402* (2013.01); *B60R 2300/107* (2013.01); *B60R 2300/108* (2013.01); *B60R 2300/303* (2013.01); *B60R 2300/806* (2013.01)

(58) Field of Classification Search
None
See application file for complete search history.

(56) References Cited

U.S. PATENT DOCUMENTS

| | | | |
|---|---|---|---|
| 5,883,739 A | 3/1999 | Ashihara et al. | |
| 6,535,242 B1 | 3/2003 | Strumolo et al. | |
| 8,471,908 B2 | 6/2013 | Kanning et al. | |
| 8,830,318 B2 | 9/2014 | Diehl et al. | |
| 2004/0261938 A1* | 12/2004 | Bradford ...................... | 156/247 |

(Continued)

FOREIGN PATENT DOCUMENTS

| | | |
|---|---|---|
| CN | 101872277 A | 10/2010 |
| CN | 102055956 A | 5/2011 |

(Continued)

OTHER PUBLICATIONS

Office Action from Chinese Application No. 201210288524.6, dated May 5, 2015.

*Primary Examiner* — Kate Luo

(74) *Attorney, Agent, or Firm* — Zilka-Kotab, PC

(57) ABSTRACT

The present invention discloses a naked eye 3D video system for backing a vehicle and vehicles including the system. The naked eye 3D video system includes: two cameras for being installed on the rear of the vehicle and configured to capture images of the scene behind the vehicle respectively; a processor configured to divide the images captured by the two cameras into image strips in equidistance respectively, and integrate alternatively the divided image strips together into a integrated image in the manner of interleave; and a display device for being installed on the instrument panel of the vehicle, and configured to display the integrated image in the form of three dimensions for a driver to watch with the naked eye. The above naked eye 3D video system for backing a vehicle provided by the present invention can make the driver see clearly any obstacle in the scene behind the vehicle and understand spatial distribution information between the vehicle and the obstacle.

20 Claims, 3 Drawing Sheets

(56) References Cited

U.S. PATENT DOCUMENTS

| | | | |
|---|---|---|---|
| 2009/0243824 A1* | 10/2009 | Peterson et al. | 340/435 |
| 2010/0114434 A1* | 5/2010 | Kawabata et al. | 701/41 |
| 2010/0142826 A1* | 6/2010 | Kotake et al. | 382/203 |
| 2011/0102552 A1* | 5/2011 | Diehl et al. | 348/47 |
| 2012/0092498 A1 | 4/2012 | Kanning et al. | |

FOREIGN PATENT DOCUMENTS

| | | |
|---|---|---|
| CN | 102490673 A | 6/2012 |
| CN | 102555906 A | 7/2012 |

* cited by examiner

NAKED EYE 3D VIDEO SYSTEM FOR BACKING A VEHICLE AND VEHICLE INCLUDING THE SYSTEM

CROSS-REFERENCE TO RELATED APPLICATION

This application claims priority to Chinese Patent Application No. 201210288524.6, filed on Aug. 14, 2012, which is hereby incorporated by reference in its entirety.

FIELD OF INVENTION

The present invention relates generally to an on-vehicle video system, in particular, to a naked eye three dimensional (3D) video system for hacking a vehicle and a vehicle including the system.

BACKGROUND

The vehicle is becoming a means of transport for more people with social progress and technological development. Backing a vehicle in safety brings a lot of trouble to all drivers, especially to beginners. Therefore, a video system is usually used for assisting in backing a vehicle.

An existing video system for backing a vehicle includes a reversing radar. The reversing radar includes Ultrasonic sensors, a controller, a monitor and so forth and can inform a driver of the circumstance of surrounding obstacles to improve traffic safety. However, there are a lot of blind zones, such as superfine obstacles, trenches, pits, etc., due to the reversing radar detects the distance between the vehicle and the obstacles based on ultrasonic wave.

An existing video system for backing a vehicle includes a two-dimensional video system. This type of system includes one camera, a processor, a monitor and so forth, wherein the camera is used for capturing images of the scene behind the vehicle. The processor is used for processing the captured images, such as de-noising, etc., for two-dimensional display on monitor. The driver cannot learn accurately about spatial distribution information between the vehicle and obstacles due to being provided with two-dimensional images. Therefore, such system may lead to that the driver misjudges the distance, thus an accident will be caused.

Therefore, there is a need of providing a naked eye 3D video system for backing a vehicle and a vehicle including the system to solve the above problems.

SUMMARY OF THE INVENTION

A series of concepts in abbreviated forms are introduced in the summary of the invention, which will be further explained in detail in the part of detailed description. This part of the present invention does not mean trying to define key features and essential technical features of the technical solution claimed for protection; even not mean trying to determine a protection scope of the technical solution claimed for protection.

In order to solve the above problem, the present invention discloses a naked eye 3D video system for backing a vehicle, including: two cameras for being installed on a rear of the vehicle and configured to capture images of a scene behind the vehicle respectively, a processor configured to divide the images captured by the two cameras into image strips in equidistance respectively, and integrate alternatively the divided image strips together into integrated images by interleaving; and a display device, for being installed on an instrument panel of the vehicle and configured to display the integrated images in a form of three dimensions for a driver to watch with naked eyes.

In an alternative embodiment of the present invention, the two cameras are 5-9 cm apart in an installed state.

In an alternative embodiment of the present invention, the two cameras are in bilateral symmetry arrangement with respect to a vertical section of the vehicle that passes through a longitudinal central axis of the vehicle in an installed state.

In an alternative embodiment of the present invention, the two cameras are at a distance of 40-60 cm from the ground in an installed state, and an optical axis of each of the cameras is located in a vertical section of the vehicle and forms an angle of 10-20 degree downward with a horizontal plane in the installed state.

In an alternative embodiment of the present invention, the two cameras are arranged on a rear bumper of the vehicle in an installed state.

In an alternative embodiment of the present invention, the two cameras are wide-angle cameras.

In an alternative embodiment of the present invention, the captured images are transmitted from the two cameras to the processor wiredly or wirelessly.

In an alternative embodiment of the present invention, the display device includes a plurality of lenticular lenses or a plurality of parallax barriers whose size applies to the integrated images.

In an alternative embodiment of the present invention, the naked eye 3D video system further includes: a position detector configured to detect a distance between a nearest obstacle behind the vehicle and the vehicle on the basis of the captured images; wherein the display device is also used for displaying alarm signals on the basis of the distance.

Alternatively, the above naked eye 3D video system further includes an audio device configured to send audio alarm signals on the basis of the distance.

In another aspect of the present invention, a vehicle including a naked eye 3D video system for backing a vehicle is also provided. The naked eye 3D video system includes: two cameras installed on a rear of the vehicle and configured to capture images of a scene behind the vehicle respectively; a processor configured to divide the images captured by the two cameras into image strips in equidistance respectively, and integrate alternatively the divided image strips together into integrated images by interleaving; and a display device installed on an instrument panel of the vehicle and configured for display the integrated images in a form of three dimensions for a driver to watch with naked eyes.

In an alternative embodiment of the present invention, the two cameras are 5-9 cm apart.

In an alternative embodiment of the present invention, the two cameras are in bilateral symmetry arrangement with respect to a vertical section of the vehicle that passes through a longitudinal central axis of the vehicle.

In an alternative embodiment of the present invention, the two cameras are at a distance of 40-60 cm from the ground, and optical axis of each of the cameras is located in a vertical section of the vehicle and forms an angle of 10-20 degree downward with a horizontal plane.

In an alternative embodiment of the present invention, the two cameras are arranged on a rear bumper of the vehicle.

In an alternative embodiment of the present invention, the two cameras are wide-angle cameras.

In an alternative embodiment of the present invention, the captured images are transmitted from the two cameras to the processor wiredly or wirelessly.

In an alternative embodiment of the present invention, the display device includes a plurality of lenticular lenses or a plurality of parallax barriers whose size applies to the integrated images.

In an alternative embodiment of the present invention, the naked eye 3D video system further includes: a position detector configured to detect a distance between a nearest obstacle behind the vehicle and the vehicle on the basis of the captured images; wherein the display device is also used for displaying alarm signals on the basis of the distance.

Alternatively, the above naked eye 3D video system further includes an audio device configured to send audio alarm signals on the basis of the distance.

The above naked eye 3D video system for backing a vehicle provided by the present invention can allow a driver to see clearly any obstacles in the scene behind the vehicle and know the spatial distribution information between the vehicle and the obstacle.

BRIEF DESCRIPTION OF THE DRAWINGS

The following drawings of the present invention as a part of the present invention herein are used for understanding of the present invention, the implementations and the descriptions thereof are illustrated in the drawings for explaining the principle of the present invention. In the drawings.

DETAILED DESCRIPTION

A plenty of specific details are presented so as to provide more thoroughly understanding of the present invention in the description below. However, the present invention may be implemented without one or more of these details, as is obvious to those skilled in the art. In other examples, some of the technical features known in the art are not described so as to avoid confusions with the present invention.

Detailed structures will be presented in the following description for more thoroughly appreciation of the invention. Obviously, the implementation of the invention is not limited to the special details well-known by those skilled in the art. Preferred embodiments are described as following; however, the invention could also comprise other ways of implementations.

The main reason why human stereoscopic vision of objects is produced is binocular parallax. Because there is a certain distance between the left eye and the right eye, thus the scenes saw by the left eye and by the right eye have some differences. The differences allow stereo images of the world to be formed in people's eyes. Based on this principle, the naked eye 3D technology is developed. People can see stereo images without glasses using this technology.

In an on-vehicle auxiliary video system, it has a great significance to know spatial distribution information between a vehicle and objects for driving safely. Therefore, a naked eye 3D video system for backing a vehicle is provided in the present invention.

Figure 1:
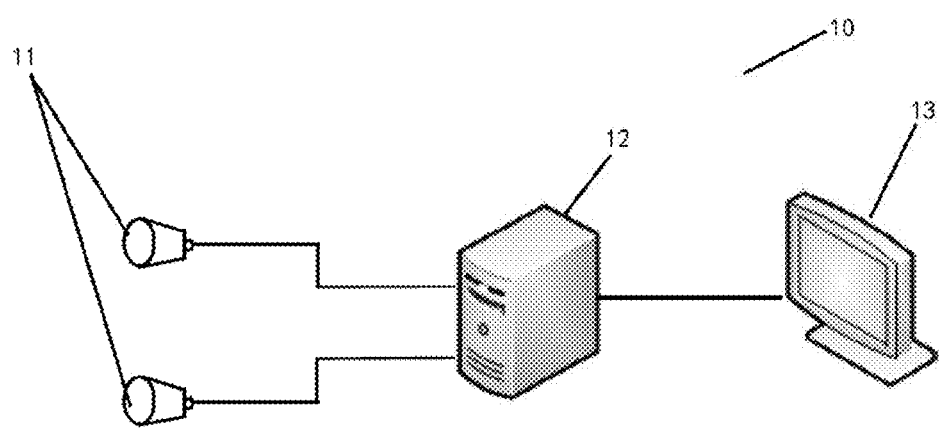
FIG. 1 illustrates a block diagram of a naked eye 3D video system for backing a vehicle according to a preferred embodiment of the present invention.

FIG. 1 illustrates a block diagram of a naked eye 3D video system 10 for backing a vehicle according to a preferred embodiment of the present invention. As shown in FIG. 1, the naked eye 3D video system 10 includes two cameras 11, a processor 12 and a display device 13. When the vehicle is reversed, the above naked eye 3D video system 10 can be started automatically or manually by the driver.

In the above naked eye 3D video 10, the two cameras 11 are used for being installed on a rear of the vehicle, and capturing images of a scene behind the vehicle respectively. The two cameras 11, equivalent to the human eyes, capture the images of the scene behind the vehicle independently and simultaneously. The two cameras 11 send the captured images to the processor 12.

According to an alternative embodiment of the present invention, the captured images are transmitted from the two cameras 11 to the processor 12 wiredly or wirelessly. The trouble of wiring between the two cameras 11 and the processor 12 can be avoided by wireless transmission.

Figure 2:
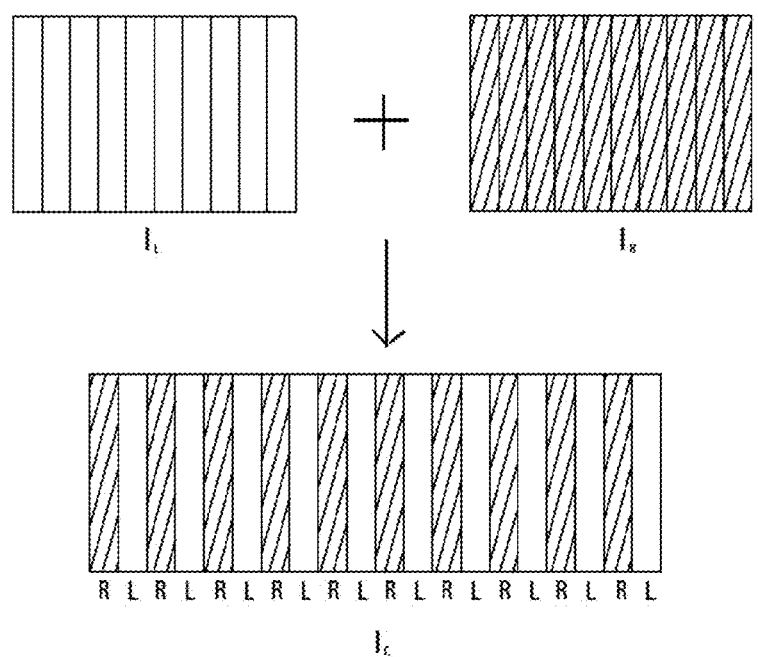
FIG. 2 illustrates a diagram of a procedure for integrating images according to a preferred embodiment of the present invention.

The processor 12 can process the received images to display the images available for naked eyes on the display device. In other words, the different images can be shown to human eyes by processing. First, the images captured by the two cameras 11 are respectively divided into strips in equidistance to form image strips. Then, the divided image strips be integrated alternatively together into integrated images by interleaving. In other words, the image strips from two different images are integrated into an integrated image in turn. FIG. 2 illustrates a diagram of a procedure for integrating images according to a preferred embodiment of the present invention. $I_L$ represents an image from the left camera, $I_R$ represents an image from the right camera, and $I_C$ represents an integrated image of $I_L$ and IR therein. In the image $I_C$, the identifier R represents the image strips from the image and the identifier L represents the image strips from the image $I_L$. Thus, by alternative integration, it causes that the left eye and the right eye only can see the images from the corresponding camera on the display device respectively.

Display device 13 is used for being installed on an instrument panel (not shown) of the vehicle and displaying the integrated images in a form of three dimensions to provide them for being naked eye viewed by the driver. The instrument panel is usually located in front of the driver's seat for installation of control components, such as speedometer, etc. The display device 13 installed on the instrument panel can be convenient for the driver to watch.

Alternatively, the display device 13 can include a plurality of lenticular lenses or parallax barriers whose sizes apply to the integrated images. The lenticular lenses and parallax barriers can be used for separating the integrated images. The lenticular lenses make use of the refraction principle to allow each of the eyes only see the images from a corresponding camera. The parallax barriers hide the image strips from a non-corresponding camera from each eye, and then let each of the eyes only can see the images from the corresponding camera through gaps between the parallax barriers.

According to a preferred embodiment of the present invention, the naked eye 3D video system 10 for backing a vehicle may also include a position detector configured to detect a distance between a nearest obstacle behind the vehicle and the vehicle itself on the basis of the captured images. It should be understood for those skilled in the art that the position detector may be implemented by hardware, firmware, logical circuit or any combination thereof. In the naked eye 3D video system 10, the display device 13 may also be used for displaying alarm signals to alert the driver on the basis of the distance.

Those skilled in the art will understand that the nearest obstacle behind the vehicle may be identified based on the captured images and the distance between the nearest obstacle and the vehicle may be calculated. For example, first, the edge detection of the image is made based on Sobel operator. Then, the nearest edge away from the undermost pixels of the image is determined, thus the obstacle that the edge belongs to is the nearest obstacle. Finally, the distance between the nearest obstacle and the vehicle is determined on the basis of the installation position and the angle of the two cameras 11. The position detector can accomplish position detection based on the above principle.

According to a preferred embodiment of the present invention, the above naked eye 3D video system 10 may also include an audio device, which is used for sending audio alarm signals on the basis of the distance of the nearest obstacle and the vehicle in order to improve attention level of the driver. It should be understood for those skilled in the art that the audio device may be, for example a buzzer, a speaker and so forth.

It should be understood for those skilled in the art that the installation of the two cameras 11 has significantly large impact on the image capture, and in turn on the images presented to the driver. In various preferred embodiments of the present invention, the following various installation methods are provided for the two cameras 11.

Preferably, the two cameras 11 are 5-9 cm apart in an installed state. Thus, it can make the images presented to the driver be more similar to images observed directly by human eyes. Thereby, a crosstalk problem will be avoided. People can see the images more clearly.

Figure 3:
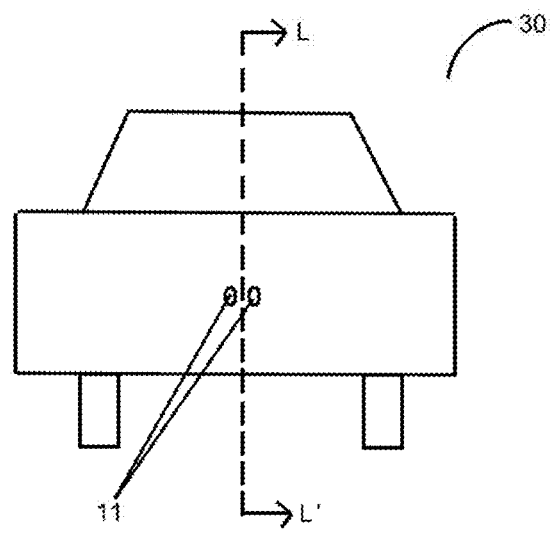
FIG. 3 illustrates a rear view of a vehicle, wherein the plane L-L' represents a vertical section of the vehicle that passes through a longitudinal central axis of the vehicle.

Preferably, the two cameras 11 are in bilateral symmetry arrangement with respect to a vertical section of the vehicle that passes through a longitudinal central axis of the vehicle in an installed state. Generally, the anterior-posterior direction of the vehicle is called as the longitudinal direction of the vehicle, the left-right direction of the vehicle is called as the lateral direction. A longitudinal line through a lateral midpoint of the vehicle is called as a longitudinal central axis. A plane perpendicular to the ground is called as a vertical section. FIG. 3 illustrates a rear view of a vehicle 30, wherein the plane L-L' represents a vertical section of the vehicle which passes through a longitudinal central axis of the vehicle. As shown in FIG. 3, the two cameras 11 are arranged left and right symmetrically with respect to the vertical section L-L' of the vehicle which passes through the longitudinal central axis of the vehicle so that it can allow the driver view scenes behind the vehicle.

Figure 4:
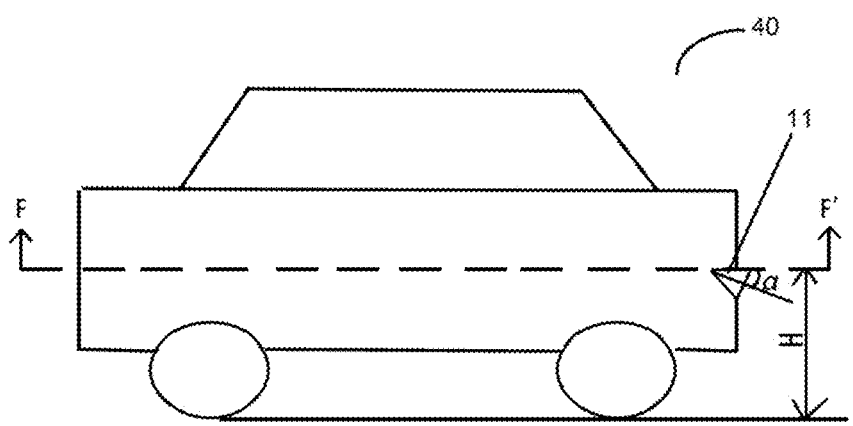
FIG. 4 illustrates a vertical cross-sectional view of a vehicle, wherein the plane F-F' represents a horizontal plane that passes through the installation locations of two cameras.

In one aspect, for the drivers, what is very important is the roadway and obstacles that are as tall as the vehicle and lower than the vehicle. In a further aspect, the projecting pail in the rear of the vehicle is usually 20-100 cm away from the ground. FIG. 4 illustrates a vertical cross-sectional view of a vehicle 40, wherein the plane F-F' represents a horizontal plane that passes through the installation locations of the two cameras 11 of the vehicle. As shown in FIG. 4, preferably, the two cameras 11 are at a distance H of 40-60 cm from the ground, and the optical axis of each camera is located in a vertical section of the vehicle and forms an angle $\alpha$ of 10-20 degree downward with a horizontal plane in an installed state. Thus, a collision between the rear of the vehicle and obstacles is avoided, and all scenes that the driver is more interested in are displayed for him.

A bumper is usually the most projecting part of a vehicle. Preferably, the two cameras 11 are arranged on the rear bumper of the vehicle in an installed state. Thus, a collision between the bumper of the vehicle and obstacles can be avoided in order to ensure safety in backing a vehicle.

In order to make a vision of the camera to be broader to provide the driver with wide-angle images, the two cameras 11 are preferably wide-angle cameras.

Figure 5:
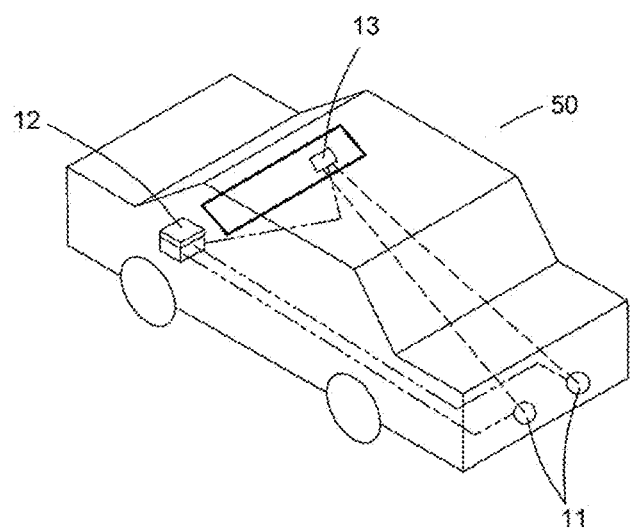
FIG. 5 illustrates a diagram of a vehicle according to a preferred embodiment of the present invention.

According to a further aspect of the present invention, a vehicle is provided. FIG. 5 illustrates a diagram of a vehicle 50 according to a preferred embodiment of the present invention. The vehicle 50 includes the above naked eye 3D video system for backing a vehicle. For brevity, a detailed description is omitted for the naked eye 3D system described with reference to the above embodiments. Those skilled in the art can understand that specific structure and operation mode of the naked eye 3D system with reference to FIG. 1 to FIG. 4 in combination with the above description.

The present invention has been described through the above-mentioned embodiments. However, it will be understand that the above-mentioned embodiments are for the purpose of demonstration and description and not for the purpose of limiting the present to the scope of the described embodiments. Moreover, those skilled in the art could appreciated that the present invention is not limited to the above mentioned embodiments and that various modifications and adaptations in accordance of the teaching of the present invention may be made within the scope and spirit of the present invention. The protection scope of the present invention is further defined by the following claims and equivalent scope thereof.

The invention claimed is:

1. A naked eye 3D video system for backing a vehicle, including:
    two cameras for being installed on a rear of the vehicle and configured to capture images of a scene behind the vehicle respectively;
    a processor configured to divide the images captured by the two cameras into image strips in equidistance respectively, and integrate alternatively the divided image strips together into integrated images by interleaving;
    a display device for being installed on an instrument panel of the vehicle and configured to display the integrated images in a form of three dimensions for a driver to watch with naked eyes; and
    a position detector configured to detect a distance between a nearest obstacle behind the vehicle and the vehicle on the basis of the captured images;
    wherein the position detector is configured to perform edge detection of the captured images based on a Sobel operator to determine a nearest edge in the captured images, identify a nearest obstacle that belongs to the nearest edge, and calculate a distance between the nearest obstacle and the vehicle based on installation positions and an angle between the cameras.

2. The naked eye 3D video system according to claim 1, wherein the two cameras are 5-9 cm apart in an installed state.

3. The naked eye 3D video system according to claim 1, wherein the two cameras are in bilateral symmetry arrangement with respect to a vertical section of the vehicle that passes through a longitudinal central axis of the vehicle in an installed state.

4. The naked eye 3D video system according to claim 1, wherein the two cameras are at a distance of 40-60 cm from the ground in an installed state, and an optical axis of each of the cameras is located in a vertical section of the vehicle and forms an angle of 10-20 degree downward with a horizontal plane in the installed state.

5. The naked eye 3D video system according to claim 1, wherein the two cameras are arranged on a rear bumper of the vehicle in an installed state.

6. The naked eye 3D video system according to claim 1, wherein the two cameras are wide-angle cameras.

7. The naked eye 3D video system according to claim 1, wherein the captured images are transmitted from the two cameras to the processor via wired or wireless communication.

8. The naked eye 3D video system according to claim 1, wherein the display device includes a plurality of lenticular lenses or a plurality of parallax barriers whose size applies to the integrated images.

9. The naked eye 3D video system according to claim 1, wherein the display device is also used for displaying alarm signals on the basis of the distance.

10. The naked eye 3D video system according to claim 9, further including: an audio device configured to send audio alarm signals on the basis of the distance.

11. A vehicle including a naked eye 3D video system for backing the vehicle, the naked eye 3D video system including:
two cameras installed on a rear of the vehicle and configured to capture images of a scene behind the vehicle respectively;
a processor configured to divide the images captured by the two cameras into image strips in equidistance respectively, and integrate alternatively the divided image strips together into integrated images by interleaving;
a display device installed on an instrument panel of the vehicle and configured to display the integrated images in a form of three dimensions for a driver to watch with naked eyes; and
a position detector configured to detect a distance between a nearest obstacle behind the vehicle and the vehicle on the basis of the captured images;
wherein the position detector is configured to perform edge detection of the captured images based on a Sobel operator to determine a nearest edge in the captured images, identify a nearest obstacle that belongs to the nearest edge, and calculate a distance between the nearest obstacle and the vehicle based on installation positions and an angle between the cameras.

12. The vehicle according to claim 11, wherein the two cameras are 5-9 cm apart.

13. The vehicle according to claim 11, wherein the two cameras are in bilateral symmetry arrangement with respect to a vertical section of the vehicle that passes through a longitudinal central axis of the vehicle.

14. The vehicle according to claim 11, wherein the two cameras are at a distance of 40-60 cm from the ground, and an optical axis of each of the cameras is located in a vertical section of the vehicle and forms an angle of 10-20 degree downward with a horizontal plane.

15. The vehicle according to claim 11, wherein the two cameras are arranged on a rear bumper of the vehicle.

16. The vehicle according to claim 11, wherein the two cameras are wide-angle cameras.

17. The vehicle according to claim 11, wherein the captured images are transmitted from the two cameras to the processor via wired or wireless communication.

18. The vehicle according to claim 11, wherein the display device includes a plurality of lenticular lenses or a plurality of parallax barriers whose size applies to the integrated images.

19. The vehicle according to claim 11,
wherein the display device is also used for displaying alarm signals on the basis of the distance.

20. The vehicle according to claim 19, wherein the naked eye 3D video system further including: an audio device configured to send audio alarm signals on the basis of the distance.

* * * * *